UNITED STATES PATENT OFFICE.

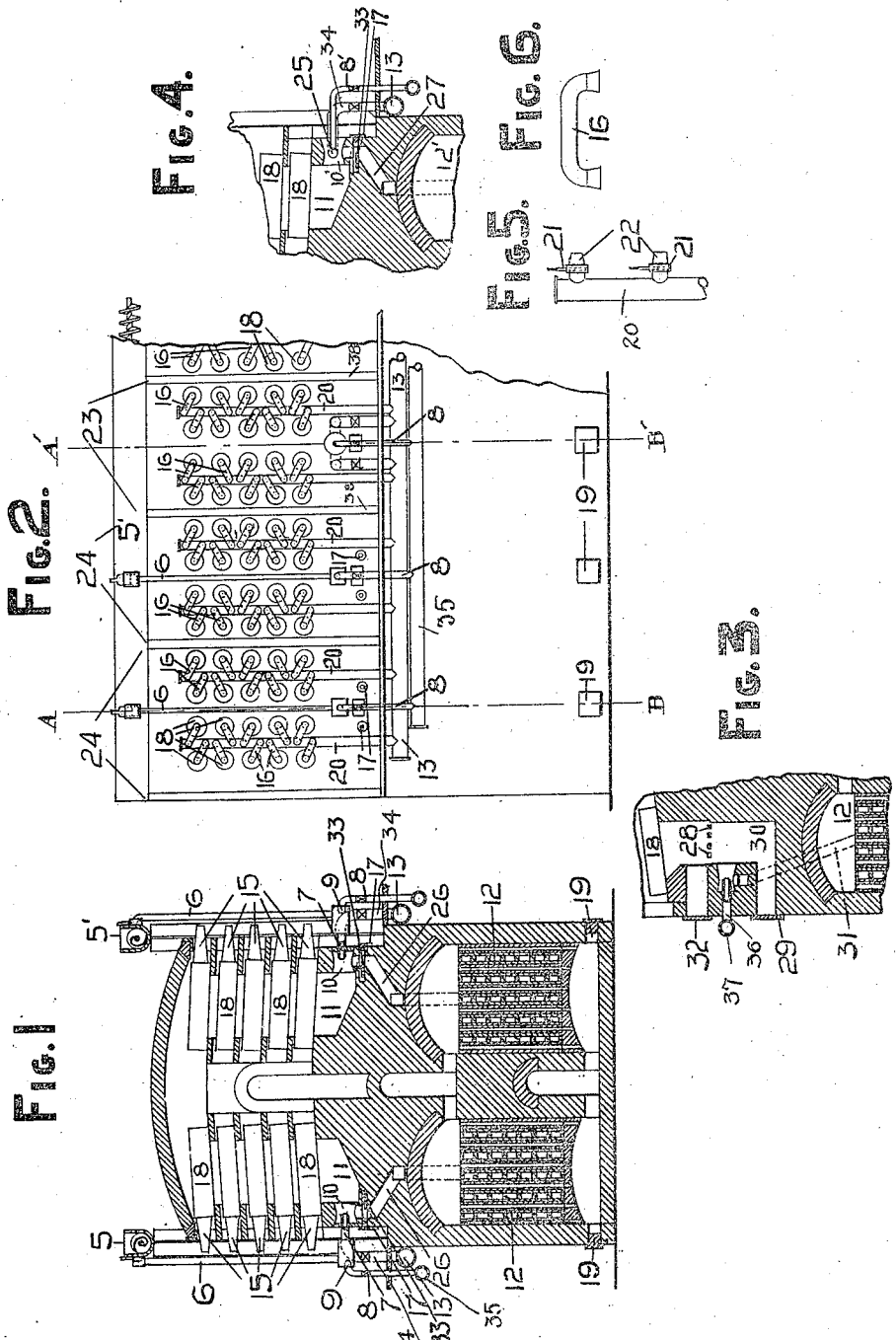

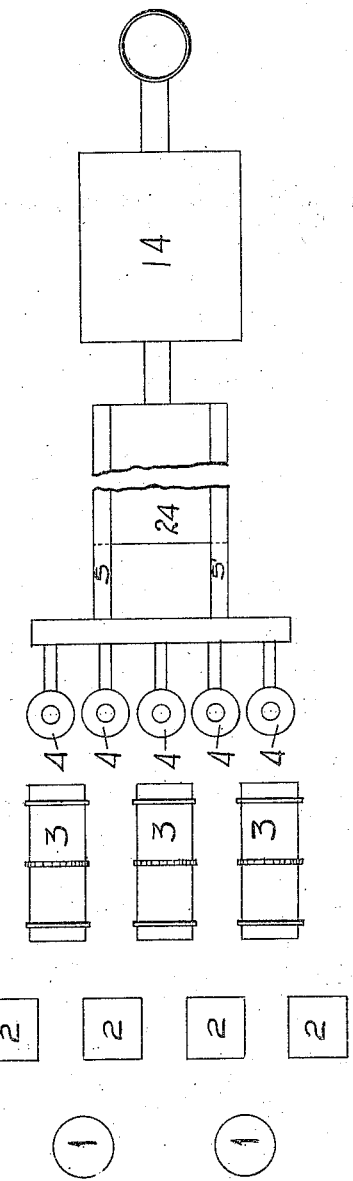

HENRY L. DOHERTY, OF NEW YORK, N. Y.

METHOD OF SMELTING SULFID ORES.

1,150,841. Specification of Letters Patent. Patented Aug. 17, 1915.

Application filed April 20, 1911, Serial No. 622,360. Renewed January 19, 1915. Serial No. 3,154.

*To all whom it may concern:*

Be it known that I, HENRY L. DOHERTY, a citizen of the United States, and a resident of New York city, in the county of New York and State of New York, have invented certain new and useful Improvements in Methods of Smelting Sulfid Ores, of which the following is a specification.

This invention relates to methods of smelting sulfid ores and, in particular, to the smelting of those varieties of such ores which in their oxidation generate sufficient heat to permit of them being used as fuels.

The object of my invention is to cheapen the cost of smelting sulfid ores by utilizing in the smelting operation the surplus heat developed in the roasting of the ores, and the combustion gases given off in the reduction of the ore.

My invention consists, briefly stated, in burning the fairly rich sulfids (preferably concentrates) under such conditions that the surplus heat of the oxidation can be utilized to heat the retorts or other chambers in which the metal is reduced from the oxidized ore, mixing the oxidized ore with carbon, heating the mixture in the before-mentioned retorts and conducting to a portion of the retort furnace the combustible gases generated in the retorts during the reduction of the metal and burning the same therein to assist in supplying heat for the reduction of the metal.

In the accompanying drawings I have shown diagrammatically an apparatus which may be operated to carry out my invention in the smelting of sulfid ores of zinc, and have limited my description of my invention to this application of it. It is to be understood, however, that I do not limit my invention to the smelting of zinc ores but claim it in connection with all and any one of the several uses to which it may be applied.

In the drawings, Figure 1, is a cross-section through a furnace for carrying out my invention in its preferred form on the line A—B of Fig. 2. Fig. 2 is a part front elevation of the front of the same furnace showing the arrangement of the burners, gas off-takes, etc. Fig. 3 is a part cross-section of a direct-fired furnace using my invention embodying the modifications of the apparatus of Figs. 1 and 2 which is required to adapt it to direct firing. Fig. 4 is a part cross-section on the line A' B' of Fig. 2, through the retort-gas burner. Fig. 5 is a detail of one of the retort-gas conduits. Fig. 6 is a detail of one of the connecting pipes from the condensers to the retort-gas conduits. Fig. 7 is a diagrammatic plan of the apparatus shown in part in Figs. 1 and 2.

In the preferred method of carrying out my invention, the crude blende or sulfid ore is first crushed in crushers, 1, and then concentrated in any suitable form of concentrators, 2. Here the comparatively fine sulfid mineral (blende) is separated from the gangue of the ore. The separated sulfid is next dried in the driers, 3, (when a wet method of concentartion has been used) and then passed to the grinding mills, 4. Here the sulfid is reduced to powder. The degree of fineness to which it is necessary to reduce the ore varies with various ores, but should always be at least 100 mesh. The finely powdered sulfid is next distributed by the conveyers 5 and 5' to the feed chutes, 6, of fuel burners, 7. These latter may be of almost any type in common use for the burning of powdered fuel—such, for instance, as are in common use in the firing of cement kilns. Air, under pressure, discharges from the pipe 8 through the nozzle 9, while the powdered sulfid is continuously supplied through the chutes 6. The jet of air from the nozzles 9 picks up the powdered sulfid and the mixture of air and sulfid discharges through the passages 10 into the corresponding combustion chambers 11. As the sulfid-laden air current discharges through 10, it induces a flow of hot air from the recuperators 12 through the passages 26. The powdered blende in suspension in the air current burns according to the reaction,

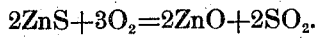
$$2ZnS + 3O_2 = 2ZnO + 2SO_2.$$

A small portion of the sulfur usually burns to sulfur trioxid or sulfuric anhydrid which combines with an equivalent amount of the ZnO to form sulfate of zinc ($ZnSO_4$). The regulation should be such, however, that this reaction will be prevented as far as practicable.

The total quantity of air supplied to the furnaces, 24, for the combustion of the zinc sulfid should be restricted to give only a relatively small excess. Otherwise, on account of the high temperature, an objectionably large proportion of the metal will be oxidized to sulfate, as described above. When this takes place the subsequent treatment of the oxidized ore is complicated owing to the necessity for leaching out the sulfate and treating it separately (usually by an electrolytic method) from the oxid. As this method of reduction is not as economical as the direct reduction by smelting I aim to avoid the necessity for the introduction of any subsidiary treatment by avoiding in the first place the formation of $ZnSO_4$ as far as possible. Therefore, I prefer to work with the theoretical quantity of or only a slight excess of air, whereby the formation of sulfate is largely avoided. Under this condition, a small portion of the blende usually escapes oxidation. This separates almost entirely from the gases in the furnace itself and in the flues of the recuperators, from whence it can be raked out through the openings 17 and 19 provided for this purpose in the walls of the furnace and recuperators, respectively. Although mixed with ZnO this ZnS may be re-injected into the furnace with a fresh lot of raw ore and occasion but very little loss in the efficiency of the process. In the furnace, the already finely powdered ZnS is still further disintegrated by the process of oxidation, producing very finely divided oxid of the metal which is readily flotant in the rapidly moving current of gaseous $SO_2$ and $N_2$. The hot combustion gases bearing the oxid in suspension sweep around the retorts in the oxidizing portion of the retort furnace, heating the same, and thence pass through the combustion gas flues of the recuperators 12, to the separator 14. Here the ZnO is separated from the gases in which it is suspended. The effluent gases from the separator 14 ($SO_2$, $N_2$, and any excess of $O_2$ and small quantities of various other gases) may either be permitted to waste into the atmosphere, passed through sulfuric acid chambers to convert the $SO_2$ to sulfuric acid or treated in any way desired. The ZnO separator may be the customary "bag house" with bags of asbestos fabric, or any other form that is suited to the operation required. Such method of treatment, however, I do not claim herein.

The ZnO recovered in the separator is mixed with the proper proportion of carbon (in the form of anthracite coal or coke), the proportion of carbon being from 50 to 100% of the weight of the ZnO. This relatively large excess is provided to prevent the formation of $CO_2$ in the retorts with the resulting large deposition of zinc oxid in the condensers. The mixture of ZnO and carbon is charged into the retorts, 18, and the condensers, 15, put in place and luted. The sheet metal connections, 16, connecting each of the retorts 18 with its coöperating gas pipe, 20, are next put in place and the gate valve or dampers, 21, on the short connections 22 attached to the pipes 20 at appropriate intervals, opened.

When the charge in the retorts has reached the proper temperature (2300°-2600° F.) the zinc oxid is reduced by the carbon present, forming Zn and CO. The temperature in the retorts themselves being above the boiling point of zinc the metal is liberated in the vaporized condition. The mixture of CO and zinc vapor passes from the retorts into the condensers 15. These being more or less subjected to the cooling action of the atmosphere and not directly heated by the furnaces, are maintained at a temperature of between 850° and 1000° F. This being below the boiling point of zinc the vapor condenses on the walls of the condensers 15 and the liquid Zn collects in the bottoms of the condensers. The CO (accompanied by small proportions of $H_2$, $N_2$ and usually traces of $CO_2$) passes out of the condensers 15, through the connections 16, gas conduits 20, 13 and connections 34, to the gas ports 25 of a portion of the retort furnace 23, preferably separate from the main portion 24, which is fired by sulfid ore, the quantity of CO produced in the retorts not being sufficient to fire the entire furnace. It is of course advantageous to fire with the CO from the retorts to the extent to which that is available should the sulfid be insufficient for the purpose. Air for the combustion of the CO enters through the dampered air passages 27. The combustion gases, after sweeping around the retorts 18, pass to the recuperators 12', separate from the recuperators 12, and thence to the stack. Should the natural draft of the furnace not be sufficient, it may be supplemented by admitting air under pressure to the passage 10' from a connection 8' from the air main 35. The discharge of this air through the passage 10' induces a flow of CO from the main 13 and more air from the recuperator, on the one hand, and exerts a forcing action on the furnace draft, on the other.

The retort furnaces for zinc smelting are often constructed so that the furnace chamber is continuous from end to end of the block, with separate burners or fire-places at intervals along each face of the furnace. Sometimes, however, (and this is the construction best adapted for carrying out my process) the main furnace chamber is divided into sections by walls thrown across half-way between fire-places. It is not necessary, however, to adopt this construction, in the main, to adapt a furnace to carry out my invention, but is always advisable to separate the portions 23 of the furnace in which the retort carbon monoxid is to be used from the remainder in the manner described by division walls indicated at 38.

Since the theoretical flame temperature of the reaction

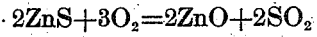
$$2ZnS + 3O_2 = 2ZnO + 2SO_2$$

with cold air is nearly 3400° F., there is no practical difficulty in securing a sufficient temperature in the retorts as long as the number of retorts to be heated by the roasting flame is properly proportioned to the heat available. By preheating the air used for the combustion, in the manner herein-described, by the heat of the effluent combustion products of the furnace, the heat available for heating the retorts is still further increased.

The modification of my invention, for the carrying out of which a modified form of apparatus is shown in Fig. 3, differs from the foregoing simply in that the metallic oxid is burned in fragments on the grates 28 of furnaces 29 in a manner similar to coal. A blast of air to support the combustion enters the ash pits 30 from the air pipes 36 connected with the air main 37. In this form of my invention the ZnO passes in small part into the gases in the form of dust, but the bulk of it works through the grates 28 into the ash pits 30 of the furnaces 32 and is removed therefrom similarly to the ash in ordinary coal firing. The combustion gases, as before, sweep around the retorts, thence pass through the recuperators and ZnO separators to the stack.

While my invention has been described with special reference to the treatment of zinc sulfid, it is to be understood that I do not limit myself to its use with this material alone. It may be applied, more or less modified to suit the peculiar demands in each case, to the treatment of iron sulfids or any similar mineral whose oxidation develops a surplus of heat. For example, coal or coke may be mixed with the sulfid, when necessary, particularly when the sulfid is to be burned on grates.

The expression "fresh sulfid" as used in the claims is intended to designate untreated sulfid, and is of course not intended to imply freshly mined sulfid or any similar meaning.

Having described my invention, what I claim is:—

1. The process of treating zinc sulfid which comprises pulverizing the sulfid, burning the pulverized sulfid in aerial suspension to heat a spelter furnace for the reduction of oxidized zinc, separating the zinc oxid formed by the said combustion from the gaseous products of the combustion, mixing the said oxid with the proper proportion of carbonaceous material and smelting the said mixture by the heat generated by the combustion of fresh sulfid.

2. The process of smelting sulfid ore which comprises burning the said ore with sufficient air to insure the oxidation of the same, mixing the oxidized ore with a reducing material, and subjecting the mixture of oxidized ore and reducing material to the heat developed by the oxidation of fresh sulfid ore.

3. The process of smelting sulfid ore which comprises burning the said ore with sufficient air to insure oxidation of the same, mixing the oxidized ore with a reducing material and subjecting the mixture of oxidized ore and reducing material to heating by heat developed by the oxidation of fresh sulfid ore and by the combustion of the combustible gases given off during the heating of the said mixture of oxidized ore and reducing material.

4. The process of smelting zinc sulfid ore which comprises burning the said ore with air, mixing the zinc oxid resulting from the oxidation of the said ore with carbonaceous material, and subjecting the mixture of zinc oxid and carbonaceous material to the heat developed by the oxidation of fresh zinc sulfid.

5. The process of smelting zinc sulfid ore which comprises burning the said ore with air to form zinc oxid, mixing the zinc oxid resulting from the oxidation of the ore with carbonaceous material, and subjecting the mixture of zinc oxid and carbonaceous material to heating by heat developed by the burning of fresh sulfid and by the combustion of the combustible gases given off during the heating of the said mixture.

6. The process of smelting sulfid ore which comprises burning the said ore with air, whereby the major portion of the metallic base of the said ore is converted into oxid, mixing the metallic oxid with carbonaceous material and subjecting the resulting mixture to the heat developed by the oxidation of fresh sulfid ore.

7. The process of smelting sulfid ore which comprises burning the said ore with air, whereby the major portion of the metallic base of the said ore is converted into oxid, mixing the metallic oxid with carbonaceous material and subjecting the mixture to heating by heat developed by the oxidation of fresh sulfid ore and by the combustion of the combustible gases given off during the heating of the said mixture of metallic oxid and carbonaceous material.

8. The process of smelting sulfid ore which comprises pulverizing the said ore, suspending the pulverized ore in a current of air, mixing with the ore-laden air current sufficient additional preheated air to insure the presence in the draft current of sufficient oxygen for the oxidation of the ore, subjecting the mixture of pulverized ore and air to a temperature sufficient to ignite the same, transferring a portion of the heat in the products from the combustion of the said sulfid ore to a fresh portion of air, separating from the said products of combustion the suspended metallic oxid therein, mixing the said oxid with carbonaceous material in quantity sufficient to reduce the said oxid, and heating the resulting mixture by heat developed in the oxidation of fresh sulfid ore.

9. The process of smelting sulfid ore which comprises pulverizing the said ore, suspending the pulverized ore in a current of air, mixing with the ore-laden air current sufficient additional preheated air to insure the presence in the draft current of sufficient oxygen for the oxidation of the ore, subjecting the mixture of pulverized ore and air to a temperature sufficient to ignite the same, transferring a portion of the heat in the products of the combustion of the ore to a fresh portion of air, separating from the products of combustion the suspended metallic oxid therein, mixing the said metallic oxid with carbonaceous material in quantity sufficient to reduce the said oxid, heating the resulting mixture by the heat developed by the oxidation of fresh sulfid ore, whereby the said oxid and the said carbonaceous material react to form the free metal and carbon monoxid, and burning the said carbon monoxid to heat a portion of the said mixture of metallic oxid and carbonaceous material.

10. The process of smelting zinc blende ore which comprises pulverizing the said blende, suspending the pulverized blende in a current of air, mixing the ore-laden air current with sufficient additional preheated air to insure the presence in the draft current of enough oxygen for the oxidation of the blende, subjecting the mixture of pulverized blende and air to a temperature sufficient to ignite the same, transferring a portion of the heat in the products of the combustion of the said blende to a fresh portion of air, separating from the said products of combustion the zinc oxid formed by the combustion of the blende, mixing the said oxid with carbonaceous material, in quantity sufficient to reduce the said oxid and heating the resulting mixture by heat developed in the combustion of a fresh portion of blende, whereby the zinc in said oxid is reduced to the metallic state.

11. The process of smelting zinc blende ore which comprises pulverizing the said blende, suspending the pulverized blende in a current of air, mixing the ore-laden air current with sufficient preheated air to insure the presence in the draft current of enough oxygen for the oxidation of the blende, subjecting the mixture of pulverized blende and air to a temperature sufficient to ignite the same, transferring a portion of the heat in the products of the combustion of the blende to a fresh portion of air, separating from the said products of combustion the zinc oxid formed by the combustion of the blende, mixing the said oxid with carbonaceous material in quantity sufficient to reduce the said oxid, heating the resulting mixture by heat developed in the combustion of a further portion of blende, whereby the said oxid and the said carbonaceous material are caused to react to form metallic zinc and carbon monoxid and burning the said carbon monoxid to heat a portion of the said mixture of zinc oxid and carbonaceous material.

Signed at New York city in the county of New York and State of New York this 19th day of April A. D. 1911.

HENRY L. DOHERTY.

Witnesses:
  FRANK L. BLACKBURN,
  THOS. I. CARTER.